United States Patent

Auriemma

[15] 3,651,894
[45] Mar. 28, 1972

[54] SERVING CART
[72] Inventor: Nicholas Alfred Auriemma, Miami, Fla.
[73] Assignee: Universal Oil Products Company, Des Plaines, Ill.
[22] Filed: June 4, 1970
[21] Appl. No.: 43,333

[52] U.S. Cl. ..........................188/19, 188/169, 280/33.99 C, 280/47.34
[51] Int. Cl............................................B62b 5/04
[58] Field of Search........................280/47, 33.99 C, 47.34; 188/21, 19, 20, 29, 18 A, 71.1, 72.9, 72.2, 169

[56] References Cited

UNITED STATES PATENTS 1,443,825   1/1923   Radka......................................188/21
1,785,432  12/1930   Beatty......................................188/21
2,389,320  11/1945   Nance......................................188/21
2,253,824   8/1941   Townsend et al.........................188/21
2,249,860   7/1941   Sheldrick..................................188/20

Primary Examiner—Benjamin Hersh
Assistant Examiner—Robert R. Song
Attorney—James R. Hoatson, Jr. and Ronald H. Hausch

[57] ABSTRACT

An improved serving cart having a braking means which is biased to be in a braking position. The brake shoe is maintained in pressure contact with an adjacent wheel via a spring means. It is deactivated when the operator pushes or pulls the cart with one of the two handles provided on an upper portion of the cart. In an alternative arrangement, pedals are provided on a lower portion of the cart which provide a means by which the braking means is activated or deactivated.

4 Claims, 10 Drawing Figures

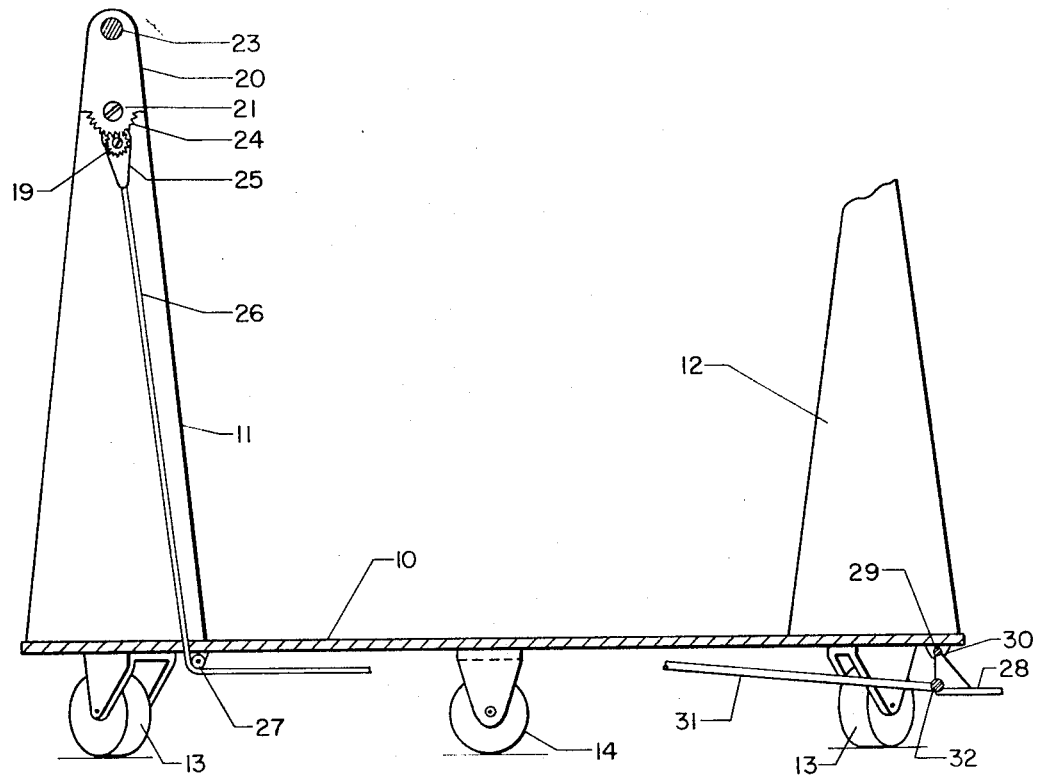
FIG. 1
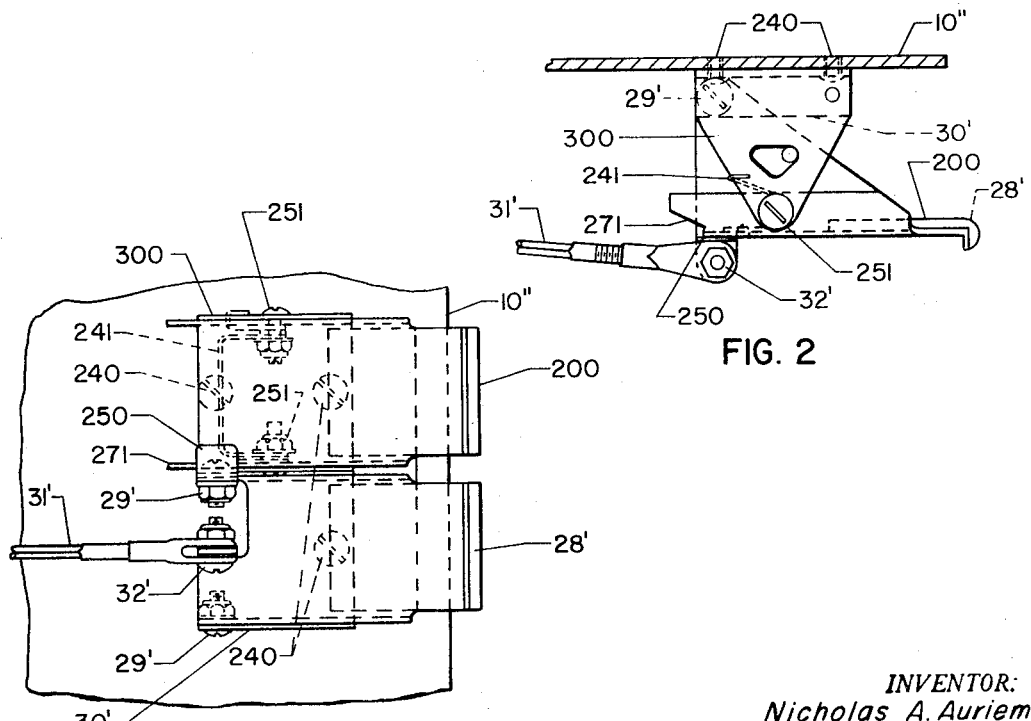
FIG. 2
FIG. 3
INVENTOR:
Nicholas A. Auriemma
BY: James R. Hoatson, Jr.
Ronald H. Hausch
ATTORNEYS

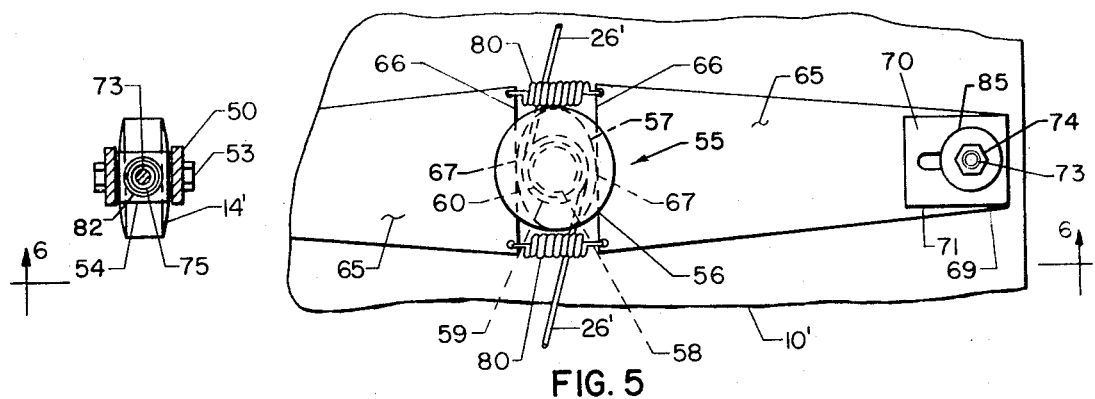
FIG. 5
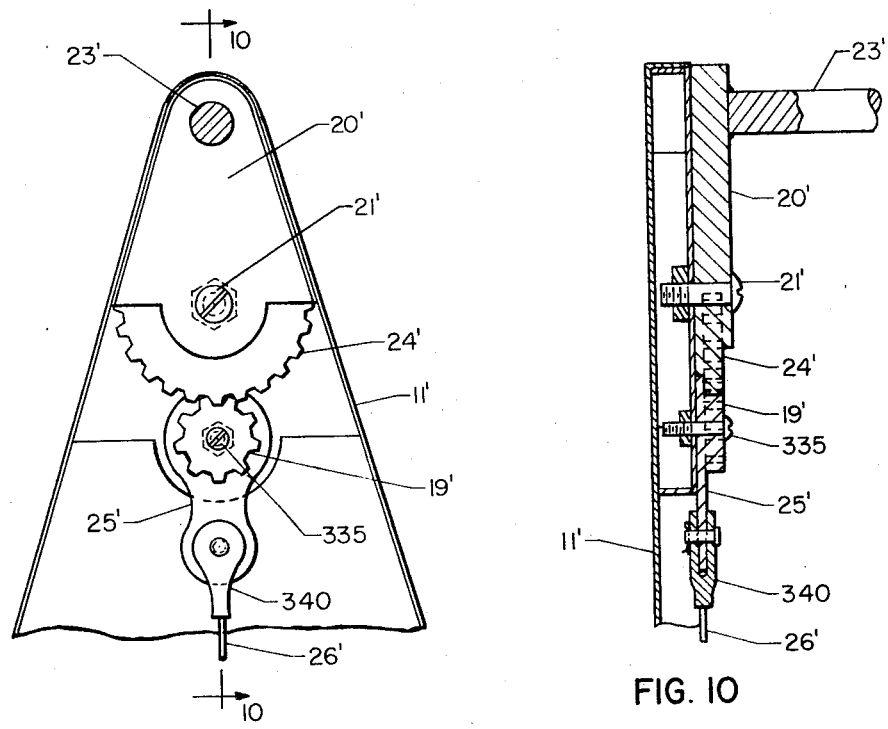
FIG. 9
FIG. 10
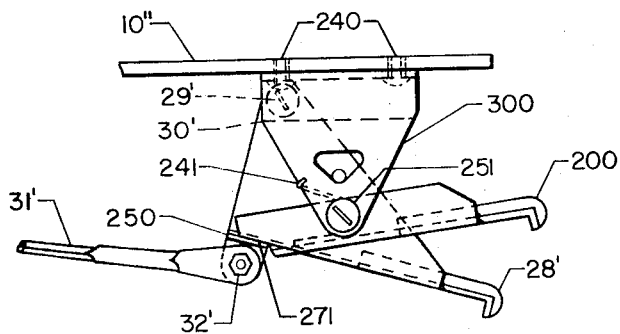
FIG. 4
INVENTOR:
Nicholas A. Auriemma
BY: James R. Hoatson, Jr.
Ronald H. Hausch
ATTORNEYS

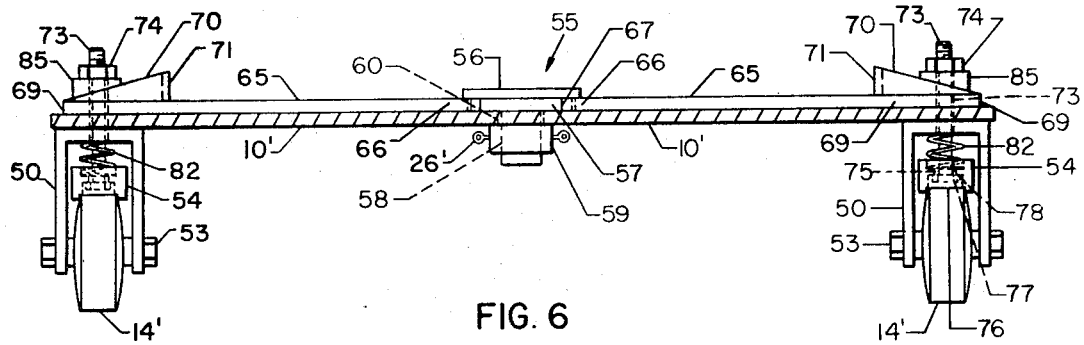

SERVING CART

The invention relates to an improved form of a serving cart for use in handling foods, beverages, magazines, and the like, and especially to handling such articles in a moving vehicle such as an aircraft, bus, or train. More particularly, the invention is directed to a serving cart that has a braking system which may be utilized in a manner so that when the operator leaves the cart, the cart remains in a braked position.

Of course, serving carts have been in use for many years for aids in serving articles to passengers of vehicles, and it is also known that brakes have been provided on such carts to prevent them from rolling through the vehicle. It is believed that the present invention provides for a novel braking system for a serving cart that is simple to operate and requires little conscious effort on the part of the operator to activate or deactivate.

Thus, it may be considered a principal object of the present invention to provide for an improved serving cart having one or more serving platforms and having a braking system that requires very little conscious effort on the part of the operator to deactivate or activate.

Another object of the present invention is to provide an improved serving cart having one or more serving platforms that has a braking system that will operate when the operator removes his hands from the cart.

Another object of this invention is to provide for an improved serving cart having one or more serving platforms that has a braking system that will operate by merely activating a pedal or lever with little physical effort.

In one of its broadest aspects, the present invention provides for an improved braking system for a serving cart having one or more serving platforms mounted on framing, and having at least three rotatable wheels mounted on said framing for the support of the cart. The braking system comprises a movable arm connected to a portion of said cart, braking means movably disposed on said framing adjacent at least one of said wheels for pressurized contacting of a portion of that wheel to intermittently prevent the rotation thereof, motion transferring means connected between said arm and said braking means for transferring motion of said arm to said braking means, and spring means connected to said braking system for maintaining said braking means in a position of pressurized contact with the adjacent wheel, whereas the movement of said arm via said motion transferring means will release said braking means from pressurized contact with said wheel.

Preferably, the movable arm is rotatably connected to the cart. In one embodiment, the arm is located on an upper portion of the cart and a handle is connected to the arm. In that embodiment, any movement of the arm will release the braking means from the adjacent wheel to permit movement of the cart. Thus, in a sense it is a "dead man" braking system. That is, if the operator releases the handle, the braking means automatically is placed in a position of pressurized contact with the adjacent wheel. When the operator desires to move the cart, he moves the arm and the braking means is automatically released. In a modified embodiment, the arm is provided on a lower part of the cart and is in the form of a brake pedal. Normally, since the brake is biased to be in pressurized contact with the adjacent wheel, the cart is in a braked position. To release the braking means, the operator merely depresses the pedal which requires little physical effort, and consequently the braking means is removed from contact with the adjacent wheel.

In one embodiment, the braking means comprises a braking shoe slidably mounted above at least one of the wheels. In that embodiment, the motion transferring means includes a cam means rotatably connected to the framing, a first follower having a first end and a second end, the second end having a cam surface thereon. The first follower contacts the cam means adjacent the first end. Any rotation of the cam means will cause the first follower to move laterally. A second follower contacts the cam surface of the first follower and is connected to the brake shoe. The lateral motion of the first follower will transfer motion to the second follower and to the braking shoe via the cam surface. The spring means in this embodiment comprises a tension spring connected to the first follower and a compression spring disposed between the braking shoe and a portion of the framing above the wheel such as the wheel fork. The tension spring is biased to maintain the first follower in a position permitting the braking shoe to be in pressurized contact with the adjacent wheel. The compression spring is biased to maintain the braking shoe in pressurized contact with the adjacent wheel. Thus, the braking shoe is normally in pressurized contact with the adjacent wheel. When the cam means is caused to rotate, it moves the first follower which moves the second follower which in turn lifts the brake shoe from the wheel.

In a modified embodiment, the braking means comprises a braking rocker rotatably mounted adjacent at least one of the wheels. In that embodiment, the motion transferring means includes a cam means rotatably connected to the framing of the cart, and a follower having a first and second end, said first follower contacting said cam means adjacent said first end. Any rotation of the cam means will cause this follower to move laterally. The follower is rotatably connected to the braking rocker adjacent the second end. Any lateral motion of the follower will transfer motion to the braking rocker. In this embodiment, the spring means comprises a tension spring connected to the follower and being biased to maintain the braking rocker in pressurized contact with the adjacent wheel. Thus, normally the braking rocker will be in pressurized contact with the adjacent wheel and when the cam means is caused to rotate it moves the follower laterally which in turn causes the braking rocker to be rotated from its position of pressurized contact with the wheel.

The motion transferring means of both of these embodiments may further comprise a wire or cable communicating in a taut path between the cam means and the movable arm. Any movement of the movable arm will thus cause the cam to rotate. On the other hand, the motion transferring means may also comprise a connecting rod rotatably connected to the cam means and to the movable arm whereby the movement of the arm will rotate the cam section.

Typically, to prevent the cart from rotating about one wheel when it is being braked, braking means may be associated with two wheels of a cart. Also to provide for accessibility at two ends of a cart, a movable arm provided in conjunction with motion transferring means may be provided at both ends of the cart.

Reference to the accompanying diagrammatic drawing and the following description thereof, will serve to point out and more fully illustrate the design and construction of my invention as well as to assist in further setting forth certain advantageous features in connection therewith.

FIG. 1 is an elevational view shown in section of a composite serving cart showning the relative locations of movable arms thereon.

FIG. 2 is an elevational view of a brake-pedal type movable arm assembly.

FIG. 3 is a plan view of the brake-pedal type movable arm assembly of FIG. 2 as seen from below the cart.

FIG. 4 is the brake-pedal type movable arm of FIG. 3 shown when the pedals are in a "brake off" position.

FIG. 5 is a plan view showing one embodiment of the braking means of this invention.

FIG. 6 is a sectional elevational view of the embodiment of FIG. 5 as taken through section line 6.

FIG. 7 is a plan view of an alternate embodiment of the braking means of the present invention.

FIG. 8 is a plan view of the embodiment of FIG. 7 as viewed from below the cart.

FIG. 9 is an elevational view of a handle type movable arm assembly.

FIG. 10 is a sectional view of the embodiment of FIG. 9 as taken through section line 9.

Referring now to FIG. 1 of the drawing, there is schematically illustrated a composite cart showing the relative locations of two particular types of movable arms which may be utilized in conjunction with this present invention. Shown is some framing of a typical cart which, in this particular cart, comprises a bottom platform 10 and two vertical posts 11 and 12. Actually, the framing as shown here is merely shown by way of example, and a more complex framing is contemplated in actual applications. Of course, one or more serving platforms would be connected to posts 11 and 12. Since the cart is shown in section, it should be noted that there would be corresponding posts on the other sides of the cart (not shown). Also shown are three wheels (three more would be located on the other side of the cart). Wheels 13 are typical caster wheels, and their forks would be rotatably connected to the platform 10. The fork for the center wheel 14 would not be connected to the frame 10 in the same manner but would be connected in a rigid manner. The braking means of this present invention is best suited to be located adjacent to the wheel 14 because of this feature. The braking means has been left off of this particular illustration for it would only confuse the description at this point. Of course, typically there would be corresponding wheels attached to the platform 10 on the other side of the cart. FIG. 1 is shown basically to illustrate the relative positions of two different types of movable arms contemplated to be within the scope of this invention.

A movable arm 20 is rotatably connected to post 11 via a screw or suitable connector means 21. Arm 20 is thus free to rotate about connector 21. A handle 23, shown in section, is attached to the movable arm to provide access by the operator to the movable arm. The movable arm has a gear portion 24 which mates with a gear portion 19 of a second movable arm 25 which in turn is connected to a cable or wire 26. The wire 26 communicates with the remaining portions of the motion transferring means in a taut path via pulley 27. The details of this particular movable arm and the motion transferring means used in connection therewith will be set forth in detail hereinafter. It is contemplated that if the movable arm 20 be utilized in conjunction with this present invention that a similar movable arm be located on post 12 to provide accessibility to operate the braking means from both ends of the cart.

Also shown in FIG. 1 is the brake-pedal type movable arm which is located on the right side of the cart. Of course, all details are not shown here, for FIG. 1 is presented to show only the relative locations of the movable arms contemplated. Basically, the brake-pedal type movable arm comprises a pedal 28 which is rotatably connected by a screw 29 and bracket 30 to platform 10. A connector rod 31 is connected via screw 32 to pedal 28. Any movement of the arm or brake pedal 28 will cause connector rod 31 to be moved which will cause the braking means (not shown) to be activated or deactivated, whichever is the case. A more detailed description of the brake-pedal type movable arm will be set forth hereinafter.

Reference is now made to FIGS. 5 and 6 of the drawing where one form of the braking means and motion transferring means is illustrated. There is shown a portion of the framing 10' to which is connected the wheel forks 50 which hold the wheels 14' in a rotatable manner via connectors 53. In this particular embodiment, the braking means comprises a braking shoe 54 slidably mounted above each wheel 14'. The motion transferring means includes a cam means 55 which is rotatably connected to the framing 10'. The cam means includes a top plate 56, a cam plate 57, a cylindrical shaft 58, and a collar 59. The shaft 58 is sized to fit within an opening 60 in platform 10'. After its insertion into opening 60, the collar 59 is connected to the shaft 58 which thus maintains the cam means 55 in place. Also included in the motion transferring means of this embodiment is a pair of followers 65 positioned on top of platform 10'. Each follower 65 has a first end 66 which contacts the cam plate 57 at 67. Thus, any rotation of the cam plate 57 will cause the followers 65 to move outwardly across platform 10. Each follower 65 has a second end 69 which has a cam surface 70 thereon. The cam surface 70 is formed by a wedge-shaped projection 71 attached to each follower.

The motion transferring means further includes a second follower which contacts each cam surface 70 and which is connected to the brake shoes 54. This second follower includes a bolt 73, nut 74, and a wedge washer 85. Each second follower is connected to each braking shoe 54 through an opening 75 provided in the central portion of the shoe 54. The shoe itself has a surface 76 which is adapted to contact the wheel. It also has an opening 77 in which the head of bolt 73 is sunk. The head of the bolt 73 contacts surface 78.

The spring means of this particular embodiment comprises a pair of tension springs 80 (not shown in FIG. 6) which are connected to the followers 65. If only one follower were to be used, the other end of each tension spring could be connected to the framing of the cart. Each tension spring 80 is connected to the opposing followers as illustrated. The tension springs 80 are biased to maintain the first followers 65 in a position which permits the braking shoes 54 to be in pressurized contact with each adjacent wheel 14'. In other words, they are biased to maintain the followers 65 in the position as illustrated in FIGS. 5 and 6, or in their closest possible spaced apart relationship. The spring means of this embodiment also includes compression springs 82 interdisposed between each braking shoe 54 and each wheel fork 50. Each compression spring 82 is biased to maintain the braking shoe 54 in pressurized contact with the wheels 14'. Thus, in the position as shown, the compression springs 82 will maintain the shoes 54 in pressurized contact with wheels 14' to prevent the wheels rotation and to thus prevent the cart from moving about. To release the braking shoes from the pressurized contact with the wheels, the cam plate 57 is rotated causing the followers 65 to move outwardly. As the followers move outwardly, the cam surfaces 70 cause the second followers to lift the braking shoes 54 from their position of pressurized contact with the wheels. The cam plate 57 may be caused to be rotated in various manners. For instance, a cable 26' may be attached to the collar 59 and pulled to cause the cam plate 57 to rotate.

Referring now to FIGS. 7 and 8 of the drawing, there is shown an alternative embodiment of the braking means of this present invention. In these figures only one side of the cart is shown to simplify the description. Shown is a lower platform 10'' of a cart to which is attached a wheel fork 100 via connectors 101. A wheel 14'' is rotatably connected to the fork via connector 103. In this particular embodiment, the braking means comprises a brake rocker or oscillator 104 which is rotatably mounted adjacent the wheel 14''. The brake rocker includes two projecting brake shoes 105 and 106 which are connected to a rocker bracket 107. The rocker bracket 107 has side plates 112 and 113 which are rotatably connected via connectors 120 and 121 to a pair of brackets 115 and 116. Brackets 115 and 116 are in turn connected to the framing via two of the connectors 101. In this embodiment, the motion transferring means includes a cam means 125 which is rotatably connected to the framing. The cam means includes a plate 126 which is connected to the framing via fasteners 127, a cylindrical shaft 128 which is rotatably connected to plate 126, a cam plate 129 which is fixed to cylindrical shaft 128, and guide plates 130 and 131. Also included in the cam means is a plate 135 which is attached to the cylindrical shaft 128 via nut 137 and is used as a driver plate for the cam means. A connector rod 31' is attached to plate 135 via a bracket assembly 151. A similar connector rod may be attached to the other end of plate 135 through opening 138 for connection to the other end of the cart. Of course, in the alternative, a cable may be utilized and connected to plate 135 for rotating the cam plate 129.

Also included in the motion transferring means of this embodiment is a follower 155 having a first end contacting the cam plate 129. The follower in this particular embodiment comprises two plates 159 and 161 which are connected together via connectors 160 to establish a means for adjustment of the braking force exerted on wheel 14''. The second end of the follower is rotatably connected to braking rocker 104 via connectors 170 and 171. Thus, rotation of the cam plate 129 will cause the follower 155 to move laterally which will cause braking rocker 104 to rotate.

The spring means in this particular embodiment comprises two tension springs 179 which are connected to the followers. Because a second follower 185 is provided in this embodiment for the wheel on the opposite side of the cart, the springs are also attached to that follower. The tension springs 179 are biased to maintain the brake shoes 105 and 106 in pressurized contact with the wheel 14''. Any movement of the cam plate 129 via plate 135 from the position as shown will cause the followers to move outwardly which in turn will cause the brake shoes 105 and 106 to rotate away from pressurized contact of wheel 14''.

Reference is now made to FIGS. 2, 3, and 4 of the drawing where a brake-pedal type movable arm is illustrated. Shown are two pedals, one being 28' and one being 200. Brake pedal 28' is the movable arm that releases the braking means from pressurized contact with the adjacent wheel. A bracket 30' and a bracket 300 are attached to the cart platform 10'' via connectors 240. Brake pedal 28' is rotatably connected to the bracket 30' via connectors 29'. Thus, as shown in FIG. 4, brake pedal 28' may be rotated downwardly about the connectors 29'. Rotatably connected to the pedal 28' via connector 32' is a connector rod 31'. Connector rod 31' may be attached to the cam means 125 as was shown in FIGS. 8 and 9. Thus, any movement of the movable arm or brake pedal 28' will move the connector rod 31' laterally which in turn will rotate the cam plate 129 of FIGS. 7 and 8. Of course, the brake-pedal type movable arm may be utilized in conjunction with the embodiment of FIGS. 5 and 6, wherein a connector rod would be connected to collar 59 instead of the wire 26' as shown.

The pedal 200 is rotatably connected to bracket 300 via connectors 251. Pedal 200 is adapted to lock brake pedal 28' in the position as shown in FIG. 4. In other words, brake pedal 28' has a projection 250 extending outwardly to overlap a portion of pedal 200 as shown in FIGS. 2 and 3. A spring 241 is attached to the bracket 300 and to pedal 200 and is biased to cause pedal 200 to rotate in a counterclockwise direction. As brake pedal 28' is caused to rotate in a clockwise direction, or downwardly, projection 250 rotates into a recessed portion 271 of brake pedal 200 which permits pedal 200 to rotate counterclockwise. After this occurs the pedals 200 and 28' become locked in the position as shown in FIG. 4 of the drawing.

If the brake pedal 28' were to be utilized in conjunction with the braking means of FIGS. 7 and 8, then ideally the arrangement or positions of the brake pedals as shown in FIG. 2 would be the braked condition of the cart. In that position, the cam plate 129 would be in the position as shown in FIGS. 7 and 8 and thus the brake rocker 104 would be in pressurized contact with wheel 14''. If the operator desired to release the brake rocker 104 from the wheel 14'', he would merely activate the brake pedal 28' in the downward or clockwise direction to the position as shown in FIG. 4. As he did this, the projection 250 would index into depressed region 271, and brake pedal 200 would rotate in the counterclockwise direction under the bias of spring 241 to lock the pedal and the connector rod 31' in the position as shown in FIG. 4. When brake pedal 28' is in that position, the connector rod 31' will have rotated the cam plate 129, causing the brake rocker 104 to rotate away from pressurized contact with wheel 14'. To reactivate the brake of this particular embodiment, the operator merely has to exert a force on pedal 200 against the bias of spring 241. As he does this, the tension springs 179 associated with the followers of FIGS. 7 and 8 will cause the cam plate 129 to rotate to their original position which in turn will cause the connector rod 31' to move the brake pedal 28' to its original position as shown in FIG. 2 of the drawing. Thus, it is seen that the operator does not have to exert a force sufficient to brake the cart but merely a force sufficient to overcome the bias of spring 241.

Reference is now made to FIGS. 9 and 10 of the drawing where a "dead man" type of movable arm is illustrated. Shown is a post 11' of a cart in which the movable arm is to be used. The movable arm 20' is attached to the post 11' in a rotatable manner via connector 21'. A handle 23' is attached to movable arm 20' to provide accessibility to the movable arm. The movable arm 20' has a gear portion 24' which has the same center of rotation as does movable arm 20'. It is adapted to mate with a gear 19' of a second movable arm 25'. Second movable arm 25' is rotatably connected to post 11' via a connector 335 and has the same center of rotation as the gear 19'. The second movable arm 25' is adapted to be connected to a wire or cable 26' via a fork and cotter pin assembly 340.

Preferably, the wire 26' is connected to cam means 55 of FIGS. 5 and 6. It must communicate with the cam means through a taut path established by conventional means, such as pulleys, etc. The rotation of arm 20' will cause the second arm 25' to rotate, which in turn will pull the wire 26'. Wire 26' will rotate the cam plate 57 which will cause the brake shoes 54 to lift from their position of pressurized contact with wheels 14'. The utilization of the gears as well as the secondary arm 25' is merely a means to proportionately magnify a relatively small movement of arm 20' to a relatively large movement of wire or cable 26'. In other words, the fact that the radius of gear portion 24' is substantially larger than the radius of gear portion 19' will cause a greater movement of the lower end of arm 25' when a small movement of the upper end of arm 20' is effected. Of course, it is contemplated to make a direct connection os wire 26' to arm 20 although the magnification of motion may be more difficult to attain. It should be noted that preferably a similar arrangement of a movable arm and gear arrangement should be located on the other end of the cart for convenient accessibility.

The arms will tend to return to their central position when released. In other words, if no pressure is exerted on arm 20', the spring means, including springs 80 and 82, will cause the braking shoes 54 to return to the pressurized contact with the wheels 14'. This action will cause the followers 65 to move inwardly which in turn will cause the cam 57 to rotate back to its original position of FIGS. 5 and 6. Thus, when the operator releases the handle 23, the brake means is automatically activated.

From the foregoing description, it is seen that the serving cart of this present invention provides a cart having a braking system that is easily activated in one embodiment and automatically activated in the other embodiment when the operator is not moving the cart. It may be well understood that various minor modifications in design and/or location of the various components of this particular serving cart and braking system be made without diverting from the scope of this present invention, and the proportions and scale of the drawing should not be limiting upon the invention.

I claim as my invention:

1. In a serving cart having one or more serving platforms mounted on framing, and at least three rotatable wheels mounted on said framing for the support thereof, an improved braking system which comprises:

a. a movable arm connected to a portion of said cart;
  b. braking means movably disposed on said framing adjacent at least one of said wheels for pressurized contacting of a portion of that wheel to intermittently prevent the rotation thereof, said braking means comprising a braking rocker rotatably mounted adjacent at least one of said wheels;
  c. motion transferring means connected between said arm and said braking means for transferring motion of said arm to said braking means, said motion transferring means including a cam means rotatably connected to said framing, and a follower having a first and second end, said follower contacting said cam means adjacent said first end, whereby rotation of said cam means will cause said follower to move laterally, said follower being rotatably connected to said braking rocker adjacent the second end, whereby the lateral motion of said follower will transfer motion to said braking rocker; and,
  d. spring means connected to said braking system for maintaining said braking means in a position of pressurized contact with the adjacent wheel, whereas the movement of said arm will, via said motion transferring means, release said braking means from pressurized contact with said adjacent wheel.

2. The improved serving cart of claim 1 further characterized in that said spring means comprises a tension spring connected to said follower and being biased to maintain said braking rocker in pressurized contact with the adjacent wheel.

3. The improved serving cart of claim 1 further characterized in that said motion transferring means comprises a connecting rod rotatably connected to said cam means and to said arm, whereby the movement of said arm will rotate said cam section.

4. The improved serving cart of claim 1 further characterized in that said movable arm is rotatably connected to said cart.

* * * * *